US008229506B2

(12) United States Patent  
Duet et al.

(10) Patent No.: US 8,229,506 B2
(45) Date of Patent: Jul. 24, 2012

(54) ENHANCED CONNECTION ACQUISITION USING AN ARRAY ANTENNA

(75) Inventors: Douglas Duet, Roswell, GA (US); Yuang Lou, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 913 days.

(21) Appl. No.: 11/619,815

(22) Filed: Jan. 4, 2007

(65) Prior Publication Data

US 2008/0194204 A1 Aug. 14, 2008

(51) Int. Cl.
*H04M 1/00* (2006.01)

(52) U.S. Cl. ............... 455/562.1; 455/561; 342/368; 343/757

(58) Field of Classification Search .............. 455/63.4, 455/561, 562.1; 342/368, 371–373, 354; 343/757, 799, 800
See application file for complete search history.

(56) References Cited

U.S. PATENT DOCUMENTS

| 5,745,841 | A  | * | 4/1998  | Reudink et al. ........... 455/62    |
| 6,104,930 | A  | * | 8/2000  | Ward et al. ............. 455/450    |
| 6,366,775 | B1 | * | 4/2002  | Startup et al. ........... 455/427   |
| 6,864,853 | B2 | * | 3/2005  | Judd et al. ............. 343/844    |
| 7,239,894 | B2 | * | 7/2007  | Corbett et al. ........... 455/562.1 |
| 7,263,385 | B2 | * | 8/2007  | Gurelli et al. ........... 455/562.1 |
| 7,551,577 | B2 | * | 6/2009  | McRae .................. 370/328      |
| 2002/0135510 | A1 | * | 9/2002  | Bruno et al. ............ 342/357.1 |
| 2002/0137538 | A1 | * | 9/2002  | Chen et al. ............. 455/550    |
| 2004/0233870 | A1 | * | 11/2004 | Willenegger et al. ...... 370/329   |
| 2005/0075140 | A1 | * | 4/2005  | Famolari ............... 455/562.1  |
| 2008/0161056 | A1 | * | 7/2008  | Hovers et al. ........... 455/562.1 |

OTHER PUBLICATIONS

Schmitt, Ron, entitled "Understanding electromagnetic fields and antenna radiation takes (almost) no math," Article, EDN Magazine, Mar. 2, 2000 Edition, pp. 77-88.

* cited by examiner

*Primary Examiner* — Raymond Dean
(74) *Attorney, Agent, or Firm* — Hope Baldauff Hartman, LLC

(57) ABSTRACT

An array antenna is utilized to enhance the adaptive acquisition capability of a communication connection with one or more wireless subscribers. Subscribers who are located outside the omnidirectional range of the array antenna are acquired by using adaptive beamforming techniques to create an acquisition beam dedicated to acquiring new connections with wireless subscribers. The acquisition beam may sweep through the coverage of the array antenna seeking subscribers who lie beyond the omni range of the array antenna, but fall within the acquisition range using adaptive beamforming.

17 Claims, 4 Drawing Sheets

ENHANCED CONNECTION ACQUISITION USING AN ARRAY ANTENNA

TECHNICAL FIELD

This application relates generally to wireless communication. More particularly, this application relates to enhancing connection acquisition using an array antenna.

BACKGROUND

Radio frequency (RF) signals are commonly used for transmitting and receiving communications wirelessly. Antenna design has played an integral part in technological advancements made with respect to radio communications. Conventionally, a single antenna element such as a dipole antenna has provided an omnidirectional gain, at least within a particular dimensional plane (e.g., the earth's surface). Omnidirectional gain may be characterized by an antenna transmitting somewhat equal amounts of electromagnetic radiation in all directions within the plane, or likewise being equally sensitive to receiving radio frequencies from sources at equal distances around the antenna.

Clusters of antenna elements transmitting related signals, called array antennas, have been known to strengthen and/or weaken the collective gain of RF signals in particular directions and/or at particular times. For example, four antenna elements transmitting the same signal placed at strategic locations near each other (e.g., one half wavelength apart), may produce a beam, or strengthened gain, within a particular direction extending out from the antenna. Likewise, other directions achieve diminished gain. This is due at least in part to constructive and destructive interference caused by electromagnetic waves emitted from or transmitted to nearby elements. The effect can extend the reach of an array antenna over greater distances or into and through obstacles such as buildings. The effect can also be used to position areas of diminished gain so as to avoid disruptive radio sources or reflections in particular directions.

Advanced array antennas controlled by digital signal processors can adaptively modify the direction and strength of beams by, for example, making slight modifications to the phase of signals transmitted or received by the various elements of an array antenna. This process is referred to as beamforming, and beams formed in this fashion can extend the range of the array antenna beyond the normal omnidirectional range under equal transmitted power that the antenna might otherwise be limited to. Beamforming techniques have been used to extend the reach of an antenna and also to reduce the interference to the environment in order to maintain ongoing communications with a remote wireless subscriber. However, acquiring connections to wireless subscribers has been limited to the smaller omnidirectional range of the array antenna. This prevents the array antenna from acquiring connections to subscribers outside the omnidirectional range, but within the reach of beams.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one or more embodiments described herein, methods, systems, and computer-readable media provide for enhancing acquisition of connections to wireless subscribers. A beam of an array antenna is allocated for use as an acquisition beam and a coverage area is defined for the beam. The acquisition beam is directed to move around within the coverage area and determine whether a service request signal is received from a wireless subscriber. In this fashion, the wireless subscriber can be located in an area lying beyond the omnidirectional range of the array antenna, but within the beam reach of the array antenna.

Other embodiments provide methods and systems of enhancing acquisition of connections to wireless subscribers using multiple acquisition beams simultaneously. As the array antenna nears capacity, acquisition beams can be reallocated for the purpose of maintaining ongoing communications with connected subscribers.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
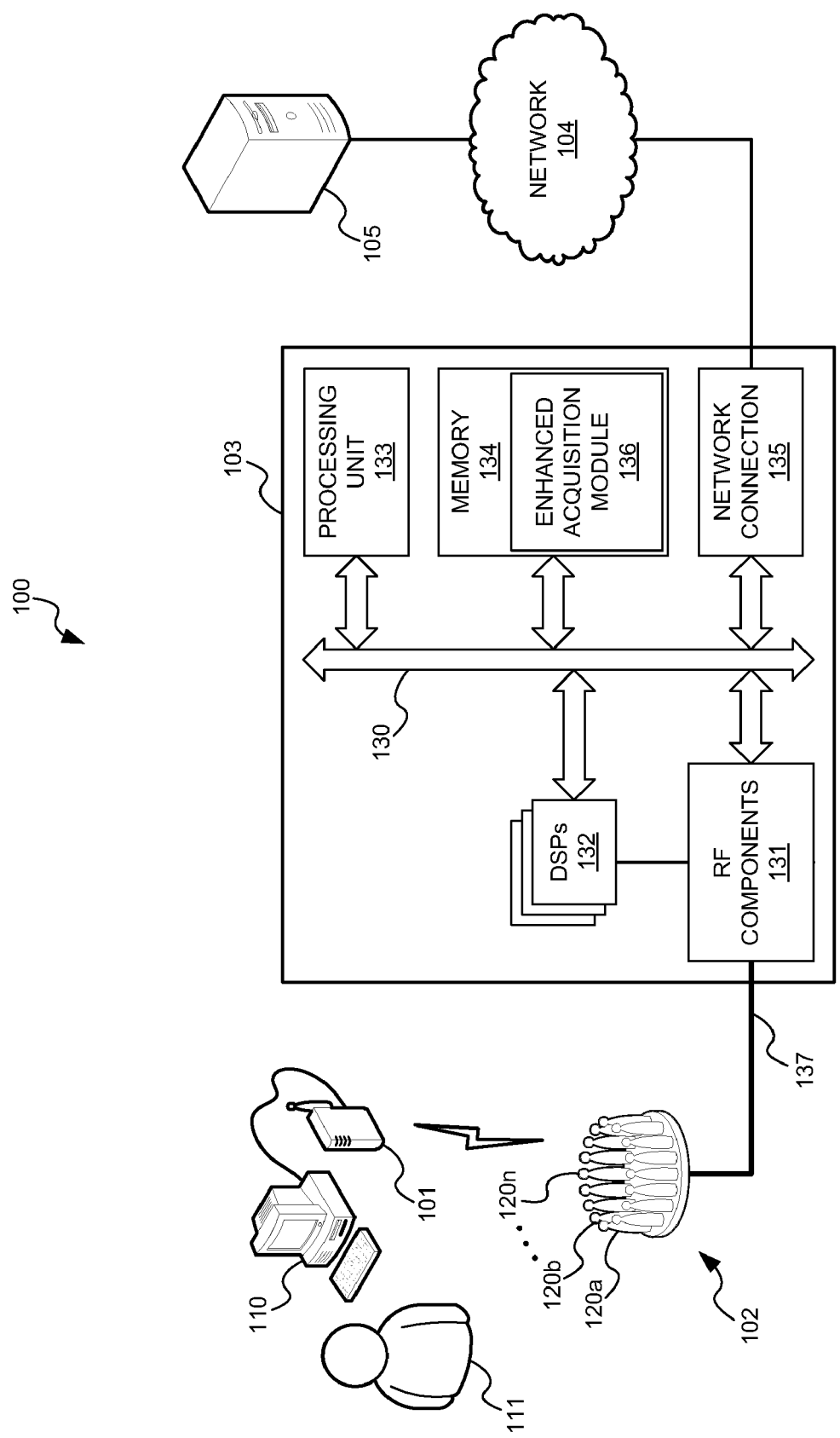
FIG. 1 is a network diagram depicting an example of a base station and system in which one or more embodiments may be implemented.

The following detailed description is directed to methods, systems, and computer-readable media for enhancing connection acquisition using an array antenna. In the following detailed description, references are made to the accompanying drawings that form a part hereof, and which are shown, by way of illustration, using specific embodiments or examples. Referring now to the drawings, in which like numerals represent like elements through the several figures, aspects of the methods, systems, and computer-readable media provided herein will be described.

FIG. 1 and the following discussion are intended to provide a brief, general description of a suitable operating environment in which embodiments of the invention may be implemented. While embodiments of the invention will be described in the general context of program modules that execute in a computer system, those skilled in the art will recognize that other embodiments of the invention may also be implemented in combination with other systems and program modules. Generally, program modules include routines, programs, components, data structures, and other types of structures that perform particular tasks or implement particular abstract data types. Moreover, those skilled in the art will appreciate that embodiments of the invention may be practiced with other computer system configurations, including hand-held devices, multiprocessor systems, microprocessor-based or programmable consumer electronics, minicomputers, mainframe computers, set top boxes, and other system configurations capable of executing the methods described. Embodiments of the invention may also be practiced in distributed computing environments where tasks are performed by remote processing devices that are linked through a network. In a distributed computing environment, program modules may be located in both local and remote memory storage devices.

With reference to FIG. 1, embodiments of the invention may include a system 100 for enhancing wireless connection acquisition using an array antenna 102. The system 100 may include a base station 103 working in conjunction with the array antenna 102 to enhance the range within which a wireless subscriber 111 may connect his or her wireless equipment 101 to the base station 103 in order to engage in ongoing wireless communication. As used herein, the term wireless subscriber 111 is intended to encompass all users and devices capable of utilizing wireless services and that may be authorized to do so.

The wireless communication may include data communications between a subscriber's computer 110 with other computers via a network 104, which may include the Internet. Likewise, the wireless communication may include voice communications (e.g., cellular phone service, Voice over Internet Protocol (VOIP)), broadcast communications (e.g., cable television, Internet Protocol Television (IPTV)), and other services usable over a wireless communication link.

In acquiring a new connection to the wireless equipment 101 of the wireless subscriber 111, the base station 103 may communicate with a server 105 via the network 104 in order to authenticate the wireless subscriber 111 and ensure that the subscriber should receive wireless communication access. The wireless equipment 101 may include, for example, a wireless modem, or any other device capable of making a wireless communications connection. The wireless equipment 101 may be handheld in size, or larger, and may utilize one or more wireless communication standards including, but not limited to, Worldwide Interoperability for Microwave Access (WiMAX), third-generation mobile phone (3G), Universal Mobile Telecommunications System (UMTS), Code Division Multiple Access (CDMA), CDMA2000, High-Speed Downlink Packet Access (HSDPA), Global System for Mobile Communication (GSM), Enhanced Data Rates for GSM Evolution (EDGE), General Packet Radio Services (GPRS), Enhanced GPRS (EGPRS), Advanced Mobile Phone System (AMPS), and Digital AMPS (D-AMPS).

In the configuration of FIG. 1, the base station 103 includes at least one processing unit 133, a memory 134, radio frequency (RF) components 131, and one or more digital signal processors (DSPs) 132. The various functional components of the base station 103 may communicate with each other via one or more buses 130. Other techniques for passing information among components of the base station 103 may be available.

Components within base station 103 may communicate with other devices, such as the server 105, via a network such as via a network connection 135 over the network 104, further discussed below. The network connection 135 may communicate with the network 104 over a wired or wireless communications link. For example, the network connection 135 may facilitate communication over a high-speed optical fiber connected to the network 104. Alternatively, the network connection 135 may facilitate communication between the base station 103 and the network 104 using a wireless medium, such as a microwave link, for example.

Within the base station 103, the processing unit 133 may include one or more microprocessors, microcontrollers, coprocessors, field programmable gate arrays (FPGAs), complex programmable logic devices (CPLDs), application specific integrated circuits (ASICs), and other devices capable of executing the methods and operations set forth below. Depending on the configuration of the base station 103, the memory 134 may be volatile (e.g., Random Access Memory (RAM)), non-volatile (e.g., Read-Only Memory (ROM), flash memory, hard drives), or some combination thereof.

The memory 134 may serve as a storage location for an operating system, one or more program modules, and/or program data, as well as other modules and data. In various embodiments, the program modules stored in the memory 134 may include an enhanced acquisition module 136, an application including similar logic, or any other set of instructions comprising such logic. It should be noted that the logic of the enhanced acquisition module 136 may be distributed and/or shared across multiple devices, including the base station 103, the server 105, the wireless equipment 101, and other devices in communication with the base station 103. More information regarding the function of the enhanced acquisition module 136 is provided below.

The base station 103 may include general and/or specialized digital signal processors 132 for use in conjunction with the analog radio signals transmitted and received via the RF components 131. The digital signal processors 132 may convert analog radio frequency signals to digital values, process the digital values, and convert the processed digital values back to analog signals for transmission over the RF components 131. Processing the digital values may include encoding data into and decoding data from the analog signals. Processing the digital values may further include introducing variations (e.g., phase variations) between analog signals sent for transmission on different elements 120a-120n of the array antenna 102. These variations may result in differences in the directionality of, or sensitivity to, a radiation pattern for the collection of elements 120a-120n that make up the array antenna 102. The practice of introducing variations between elements 120a-120n of the array antenna 102 in order to modify the radiation pattern may be referred to as beamforming. The functionality of the DSPs 132 may be replaced or assisted by digital signal processing program modules executing on the processing unit 133.

The RF components 131 may include components typically associated with radio transmitters and receivers, including RF amplifiers, modulators, and demodulators. Other components utilized to transmit or receive radio signals via the array antenna 102 may also be part of the RF components 131. It should be noted that although the array antenna 102 and the base station 103 are depicted as separate components joined by a transmission line 137, the functionality of the array antenna 102 and the base station 103 may be combined or divided in other ways. For example, the RF components 131 and the DSPs 132 may be packaged with the array antenna 102, and the remaining components of the base station 103 may communicate with such an antenna package via a digital bus or serial communication line, for example.

The array antenna 102 is depicted in FIG. 1 as having 16 antenna elements 120a-120n, but other quantities of elements may be used, from two on up. Additional elements may add to the processing complexity required for beamforming, but additional elements may also incrementally increase the range of the antenna, as well as allow for additional simultaneous beams to be formed. The array antenna 102 may be a variety of smart antenna which, in concert with the digital signal processors 132 and RF components 131, is capable of determining a direction of arrival of an incoming signal and then use beamforming techniques to track the source of the incoming signal and maintain communication. The array antenna 102 may further be a multiple input multiple output (MIMO) type antenna, which is capable of increasing the speed, range, reliability and spectral efficiency of wireless communications.

The base station 103 may include additional features and functionality other than those shown. For example, the base station 103 may include additional computer storage media, including media implemented in any method or technology for storage of information, including computer readable instructions, data structures, program modules, or other data. Examples of computer storage media can include RAM, ROM, electrically-erasable programmable ROM (EEPROM), flash memory, CD-ROM, DVD, cassettes, magnetic tape, and magnetic disks. Any such computer storage media may be accessed by components within the base station 103, or which are external to the base station 103 and connected via a communications link (e.g., Bluetooth®, USB, parallel, serial, infrared).

The base station 103 may also include one or more input devices (not shown) for accepting user input. Examples of the input devices include a keyboard, mouse, digitizing pen, microphone, touchpad, touch-display, and combinations thereof. Similarly, the base station 103 may incorporate or communicate with output devices such as video displays, speakers, printers, and combinations thereof. It should be understood that the base station 103 may also include additional forms of storage, input, and output devices, including communication ports and associated hardware for communicating with external input and output devices rather than including only components within the base station 103.

The base station 103 may include one or more network connections 135 that include hardware and/or software which enable the base station 103 and the wireless subscriber 111 to communicate with other devices over the network 104. The network 104 may include a wireless network such as, but not limited to, a Wireless Local Area Network (WLAN) such as a WiFi network, a Wireless Wide Area Network (WWAN), a Wireless Personal Area Network (WPAN) such as one enabled by Bluetooth® technology, a Wireless Metropolitan Area Network (WMAN) such as a WiMAX network, a cellular network, and/or a satellite network. Alternatively, the network 104 may include a wired network such as, but not limited to, a cable television network, a telecommunications network, a wired Wide Area Network (WAN), a wired (Local Area Network) LAN such as the Ethernet, a wired Personal Area Network (PAN), and/or a wired Metropolitan Area Network (MAN). The network 104 may also include any combination of the networks described above. Communication media, in the form of computer readable instructions, data structures, program modules, or other data in a modulated data signal, may be shared with and by the base station 104 via the communication connection 135. A modulated data signal may mean a signal that has one or more of its characteristics set or changed in such a manner as to encode information in the signal, and may include a modulated carrier wave or other transport mechanism.

Figure 2:
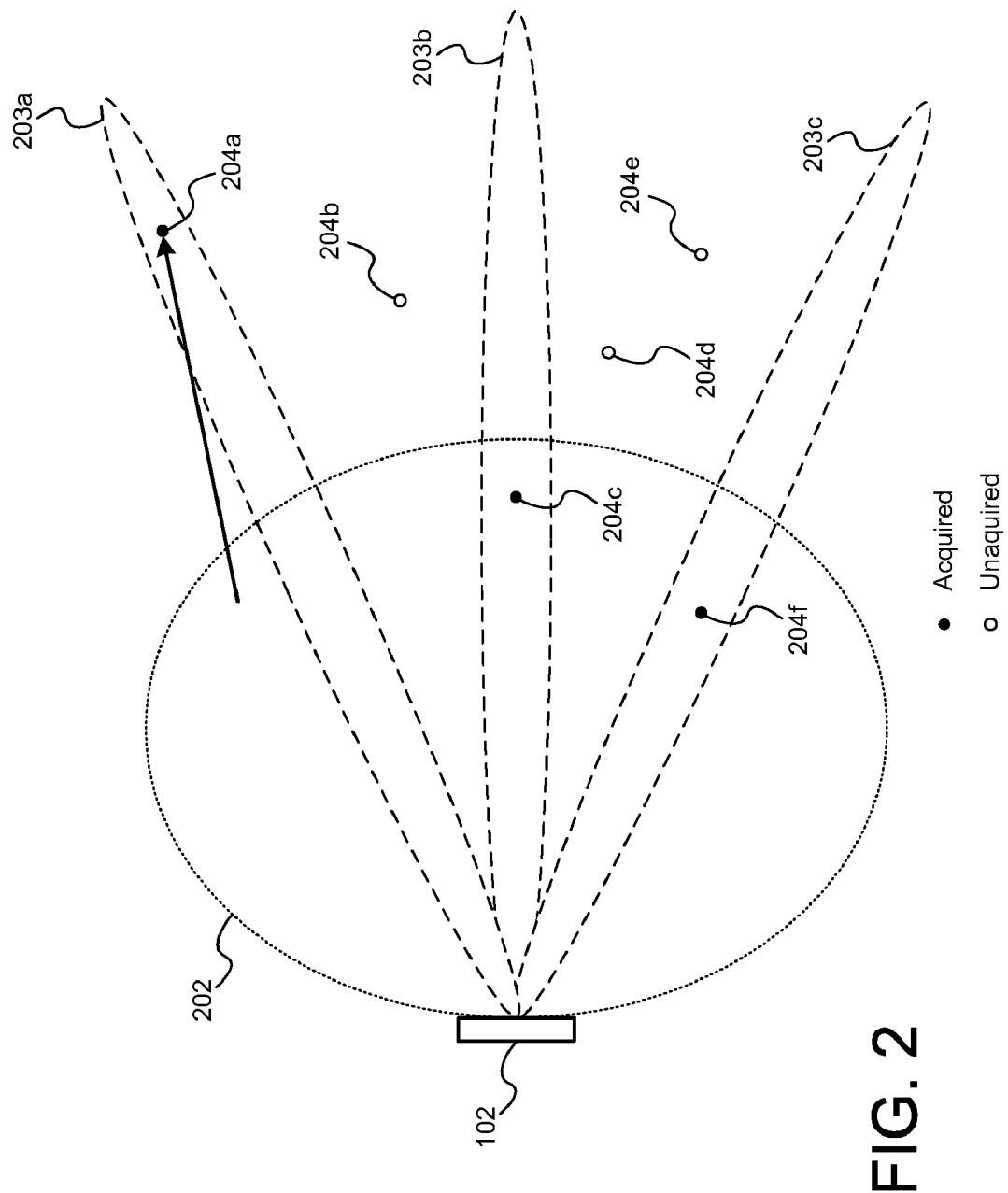
FIGS. 2 and 3 are radiation pattern diagrams depicting array antenna gain according to one or more embodiments.

FIG. 2 depicts the array antenna 102 with multiple nearby subscribers 204a, 204b, 204c, 204d, 204e, 204f (collectively, the subscribers 204), in addition to the omnidirectional coverage 202, and multiple beams 203a, 203b, and 203c (collectively, the beams 203). The depiction of FIG. 2 can be interpreted as a top-down view of the array antenna 102 and subscribers 204. The top-down view can be interpreted as showing no obstacles between the subscribers 204 and the array antenna 102. The omnidirectional coverage 202 area may be defined by the overlapping gains of each antenna element 120a-120n considered without constructive and/or destructive interference.

The array antenna 102 may be a sectored antenna, in that it does not service fully 360 degrees of coverage. Such a sectored antenna may be in use with other sectored antennas, each taking a portion of the compass. Such a configuration may be suited for use on multiple faces of a cell tower, for example. The array antenna 102 may use one or more communication techniques to enable communications with multiple subscribers 204 simultaneously. Communication techniques may include frequency division duplexing (FDD), where different frequencies may be utilized for transmitting and receiving with particular subscribers 204, and time division duplexing (TDD), where particular subscribers 204 are assigned particular slots of time to transmit or receive information.

In FIG. 2, the subscribers 204a, 204c, 204f have successfully initiated their connections with the array antenna 102, or been acquired. The array antenna 102, under the command of the base station 103, has adaptively extended the beams 203 to each of the acquired subscribers 204a, 204c, 204f upon acquisition, possibly to strengthen or extend ongoing communications and/or to increase throughput. Other reasons that the beams 203 may be adaptively extended to the acquired subscribers 204a, 204c, 204f include avoiding or accounting for reflections or other obstacles preventing higher throughput, or to avoid interference or noise from other sources. Although subscriber 204a is presently outside the omnidirectional range 202, the subscriber 204a started inside the omnidirectional range 202 and moved beyond the range. The connection of the subscriber 204a is maintained because the subscriber 204a is still within the beam reach of the array antenna 102. The array antenna 102, at the behest of the digital signal processors 132 or instructions processed by the processing unit 133, may adaptively move and modify beam 203a to account for movements by the subscriber 204a.

In some embodiments, when the array antenna 102 acquires a new connection to a subscriber, such as the wireless subscriber 111, successful acquisition may rely on the wireless subscriber 111 being within the omnidirectional range 202 at some point in time. In FIG. 2, subscribers 204b, 204d, 204e have not been acquired by the array antenna 102 under this approach because they are outside the omnidirectional range 202. Although these unacquired subscribers 204b, 204d, 204e could be serviced by additional beams 203, they are not presently in communication with the array antenna 102.

Figure 3:
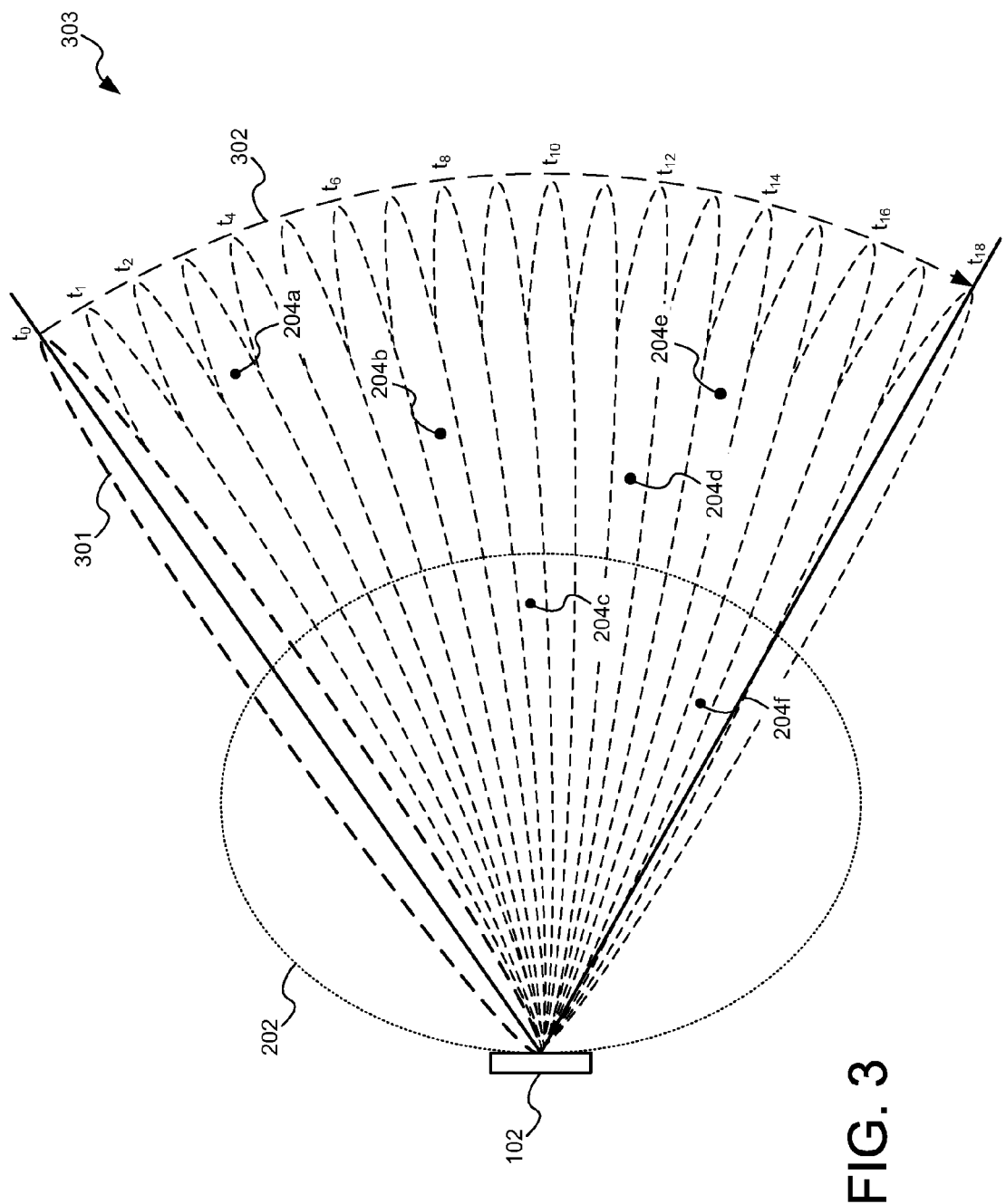

FIG. 3 depicts an alternative method for acquiring connections to nearby subscribers 204. Here, a beam 301 of the antenna array 102 has been allocated specifically for acquiring connections to subscribers 204. The acquisition beam 301 extends the acquisition range from beyond the omnidirectional range 202, at least for the slice of the compass to which it is directed at time $t_0$. In order to increase the acquisition range for other slices of the compass, the acquisition beam 301 is moved to a second position $t_1$ after a period of time. After another period of time, a third position $t_2$ is selected for the acquisition beam 301.

The acquisition beam 301 may continue to sweep across the range of the array antenna 102 until it reaches the end of the beam's coverage area 303, here a sector. At that point, the acquisition beam 301 may be repositioned to a different coverage area or restart in the current coverage area. As the subscribers 204 are detected by the acquisition beam 301, they may be handed off for processing in order to provision service for ongoing wireless communication with each subscriber. Utilizing the acquisition beam 301 to acquire the subscribers 204 effectively extends the acquisition range of the array antenna 102 from the omnidirectional range 202 to a beam range 302.

Although depicted in FIG. 3 as a single sweep through a single coverage area, other embodiments may utilize the acquisition beam 301 differently. Embodiments may, for example, allocate multiple beams as acquisition beams 301. Each acquisition beam 301 may be responsible for a portion of the available range in a multiple acquisition beam embodiment. For example, two acquisition beams may divide up the coverage area 303 of the array antenna 201 in FIG. 3. In this example, the coverage area 303 could be divided up into two sections, and a second acquisition beam could start at a position $t_{10}$, for example, moving through the remainder of the sector at the same time that the acquisition beam 301 is moving through the first half of the sector. In a time division duplexing (TDD) communication environment, different numbers of acquisition beams 301 may be allocated during each of multiple time slots.

In some embodiments, the acquisition beams 301 may additionally be allocated or deallocated depending on the current capacity of the antenna array 102 and the base station 103. If additional connections are available, and subsequently fewer beams are in use for ongoing communications, additional acquisition beams 301 may be allocated to speed the acquisition process. As the additional subscribers 204 are acquired, and the need for beams for ongoing communications increases, some or all of the acquisition beams 301 may be deallocated or reallocated. Other embodiments need not utilize a sweep of the acquisition beam 301. It should be noted that the acquisition beam 301 need not move in only a stepped fashion, as depicted in FIG. 3. The acquisition beam 301 may move in a smooth sweep. Likewise, the acquisition beam 301 or beams may jump from location to location and still accomplish a search for subscribers 204. Jumping rather than sweeping may be useful when the subscribers 204 are found within particular predictable portions of the acquisition range, for example. Acquisition beams 301 may further be modified in an effort to acquire the subscribers 204. For example, the strength and breadth of the acquisition beams 301 may be extended or diminished depending on the actual or likely locations of the subscribers 204, obstacles, radio sources, and other environmental particulars which may affect subscriber acquisition.

Figure 4:
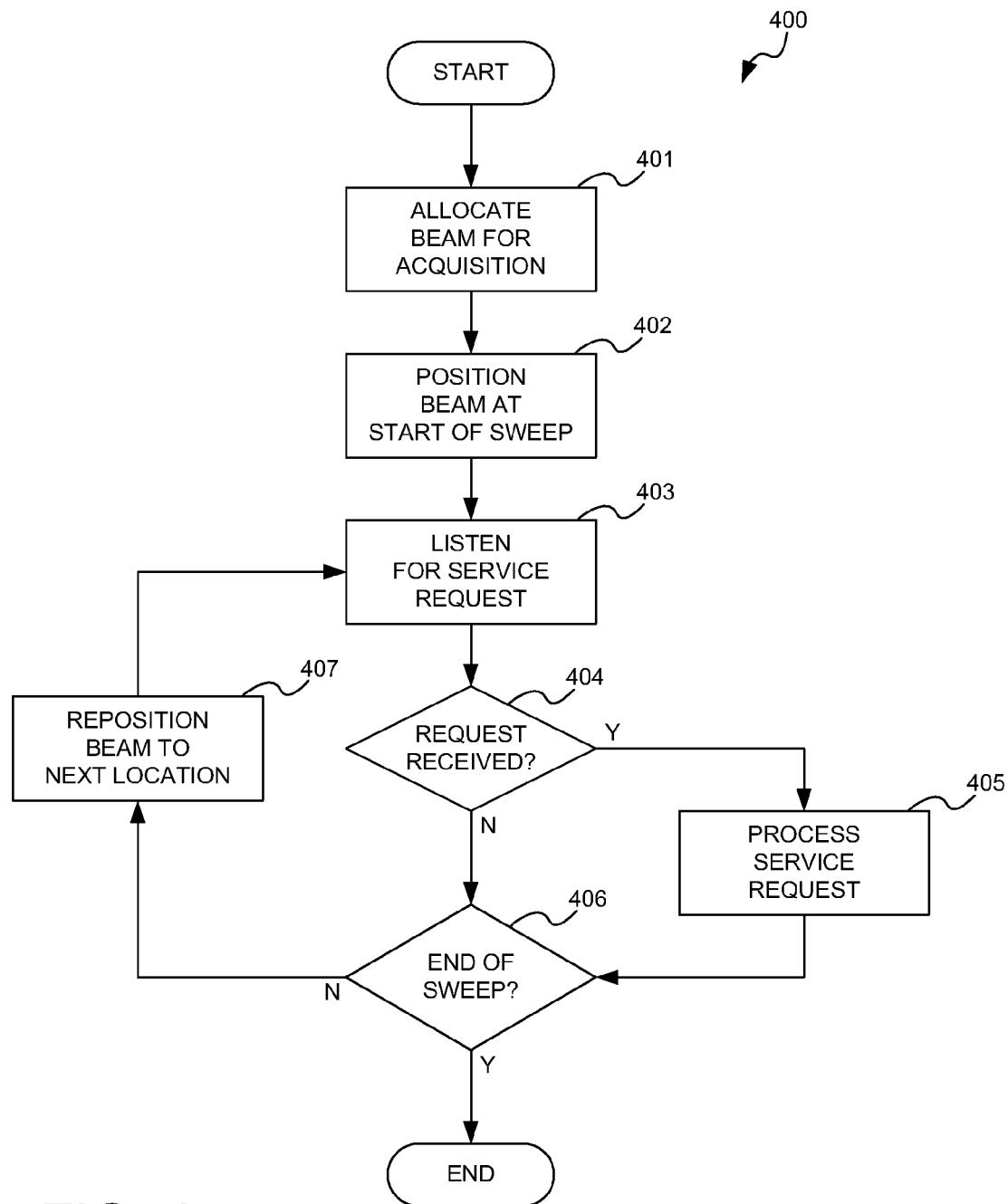
FIG. 4 is a flow diagram depicting a process for enhancing the acquisition of connections to wireless subscribers using an array antenna according to one or more embodiments.

Turning now to FIG. 4, a flowchart depicting a process 400 for enhancing subscriber acquisition using an antenna array is described. The process 400 may be implemented on one or more computing devices, such as the base station 100, and may be utilized by embodiments of the enhanced acquisition module 136. The logical operations of the various implementations presented, may be (1) a sequence of computer implemented acts or program modules running on one or more computing devices, such as the base station 100, and/or (2) interconnected machine logic circuits or circuit modules within the base station 100. The implementation is a matter of choice dependent on the performance requirements of the base station 100 on which the embodiments are implemented. Accordingly, the functional operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

The process 400 begins at operation 401, when the enhanced acquisition module 136 allocates a beam for use as the acquisition beam 301. The operation 401 may involve assigning the acquisition beam 301 the task of listening to receive a service request from an unacquired subscriber 204. Likewise, the acquisition beam 301 may be assigned the task of transmitting a subscriber seeking signal and then awaiting responses. At an operation 402, the acquisition beam 301 is positioned at the start of its sweep or sequence of locations. This may be an arbitrary location on the compass, or one selected based on the probability of finding a subscriber at that location.

From the operation 402, the process 400 continues with an operation 403, where the acquisition beam 301 listens for service requests, possibly following the transmission of a subscriber seeking signal. Subscriber equipment 101 may repeatedly send a service request signal at a particular frequency or at a particular time, and the acquisition beam 301 may be used to listen for such subscribers. At a decision 404, the enhanced acquisition module 136 determines whether a request for service is received, then direction and distance information may be forwarded by the enhanced acquisition module 136 to another module for service provisioning at an operation 405. Direction and distance information may be derived using triangulation techniques based on differences in the phase and amplitude of the service request signal by the different elements 120a-120n of the array antenna 102. Direction and distance information may alternatively be derived by the subscriber equipment 101 providing a location, such as an address or longitude and latitude coordinates, and the enhanced acquisition module 136 calculating the difference between the locations of the subscriber equipment 101 and the array antenna 102.

Service provisioning during processing of the service request at operation 405 may involve authenticating the subscriber equipment 101 and/or the wireless subscriber 111. If the subscriber equipment 101 achieves sufficiently high throughput utilizing the omnidirectional aspects of the array antenna 102, then a beam may not be allocated for ongoing communication. However, if throughput is not sufficiently high, then power levels at both the array antenna 102 and the subscriber equipment 101 may be adjusted and/or a beam may be allocated for use by the subscriber equipment 101. Authentication may involve confirming the identity of the wireless subscriber 111 requesting service. Identity may be confirmed by matching a credential or subscriber identifier with a record in a database of all subscribers 204. The database of subscribers may be located within the base station 103 locally, or it may be located remotely at the server 105. When authenticating the identity of the wireless subscriber 111, a service level associated with the subscriber 111 may be determined, possibly leading to further adjustments of any allocated beams to increase or throttle signal throughput appropriately.

If the enhanced acquisition module 136 determines that a service request has not been received at decision 404, or once the service request has been processed or handed off for processing at the operation 405, then at a decision 406, the acquisition enhancement module 136 determines whether the current location of the acquisition beam 301 is the last within the particular coverage area defined for the acquisition beam 301. This determination may be made based solely on the predetermined sweep or sequence, or it may be made based on the need to reallocate the acquisition beam 301 for use in ongoing communication with a recently acquired subscriber 204. If the current location is not the last location for the acquisition beam 301, then at an operation 407, the acquisition beam 301 is repositioned, and the process continues at the operation 403 where a service request signal is awaited.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for enhancing acquisition of a connection to a wireless subscriber, the computer-implemented method comprising:
    allocating a first beam of an array antenna for use as a first acquisition beam, while an omnidirectional gain is also provided by the array antenna, the omnidirectional gain extending an omnidirectional range associated with the array antenna and the first acquisition beam extending beyond the omnidirectional range of the array antenna;
    defining a coverage area for the first acquisition beam;
    directing the first acquisition beam to move within the coverage area, wherein the coverage area begins at a first position and ends at a second position and wherein the first acquisition beam sweeps the coverage area from the first position to the second position for detection of any service request signals;
    determining whether a service request signal is received from the wireless subscriber at the array antenna via the first acquisition beam as the first acquisition beam moves through the coverage area, the wireless subscriber located within a range of the first acquisition beam but beyond the omnidirectional range of the array antenna;
    provisioning the connection to the wireless subscriber in response to determining that the service request signal was received;
    determining that provisioning the connection to the wireless subscriber requires a second beam for providing an ongoing connection; and
    reallocating the first acquisition beam to serve as the second beam for providing the ongoing connection.

2. The computer-implemented method of claim 1, further comprising receiving an identifier of the wireless subscriber as a part of the service request signal.

3. The computer-implemented method of claim 1, wherein provisioning the connection to the wireless subscriber comprises:
    determining a location of the wireless subscriber based on the service request signal; and
    utilizing the location of the wireless subscriber for the second beam for enabling ongoing communication with the wireless subscriber via the second beam.

4. The computer-implemented method of claim 1, further comprising:
    allocating a third beam of the array antenna for use as a second acquisition beam, the second acquisition beam extending beyond the omnidirectional range of the array antenna;
    defining a first portion of the coverage area for the first acquisition beam and a second portion of the coverage area for the second acquisition beam;
    directing the first acquisition beam to move within the first portion of the coverage area and the second acquisition beam to move within the second portion of the coverage area; and
    determining whether additional service request signals are received from additional wireless subscribers at the array antenna via the first acquisition beam and the second acquisition beam.

5. The computer-implemented method of claim 4, further comprising provisioning a connection to one of the additional wireless subscribers in response to determining that one of the additional service request signals was received.

6. The computer-implemented method of claim 5, further comprising:
    determining that provisioning the connection to the one of the additional wireless subscribers will require a fourth beam for providing an ongoing connection; and
    reallocating the second acquisition beam to serve as the fourth beam for providing the ongoing connection.

7. The computer-implemented method of claim 1, wherein determining whether a service request signal is received from the wireless subscriber at the array antenna comprises utilizing a WiMAX communication standard to communicate with the wireless subscriber.

8. A system for enhancing acquisition of a connection to a wireless subscriber, the system comprising:
    a processor associated with a computer, the processor configured to execute computer-readable instructions; and
    memory having stored thereon the computer-readable instructions for enhancing acquisition of the connection to the wireless subscriber, the computer-readable instructions, when executed on the processor associated with the computer, causing the computer to:
        allocate a first beam of an array antenna for use as a first acquisition beam, while an omnidirectional gain is also provided by the array antenna, the omnidirectional gain extending an omnidirectional range associated with the array antenna and the first acquisition beam extending beyond the omnidirectional range of the array antenna,
        define a coverage area for the first acquisition beam,
        direct the first acquisition beam to move within the coverage area, wherein the coverage area begins at a first position and ends at a second position and wherein the first acquisition beam sweeps the coverage area from the first position to the second position for detection of any service request signals,
        determine whether a service request signal is received at the array antenna from the wireless subscriber via the first acquisition beam as the first acquisition beam moves through the coverage area, the wireless subscriber located within a range of the first acquisition beam but beyond the omnidirectional range of the array antenna,
        provision the connection to the wireless subscriber in response to determining that the service request signal was received,
        determine that provisioning the connection to the wireless subscriber requires a second beam for providing an ongoing connection, and
        reallocate the first acquisition beam to serve as the second beam for providing the ongoing connection.

9. The system of claim 8, wherein provisioning the connection to the wireless subscriber comprises:
    determining a location of the wireless subscriber utilizing the service request signal;

utilizing the location of the wireless subscriber for the second beam for enabling ongoing communication with the wireless subscriber via the second beam.

10. The system of claim 8, wherein the computer-readable instructions further cause the computer to:
allocate a third beam of the array antenna for use as a second acquisition beam, the second acquisition beam extending beyond the omnidirectional range of the array antenna;
define a first portion of the coverage area for the first acquisition beam and a second portion of the coverage area for the second acquisition beam;
direct the first acquisition beam to move within the first portion of the coverage area and the second acquisition beam to move within the second portion of the coverage area; and
determine whether additional service request signals are received from additional wireless subscribers at the array antenna via the first acquisition beam and the second acquisition beam.

11. The system of claim 10, wherein the computer-readable instructions further cause the computer to provision a connection to one of the additional wireless subscribers in response to determining that one of the additional service request signals was received.

12. The system of claim 11, wherein the computer-readable instructions further cause the computer to:
determine that provisioning the connection to the one of the additional wireless subscribers will require a fourth beam for providing an ongoing connection; and
reallocate the second acquisition beam to serve as the fourth beam for providing the ongoing connection.

13. A computer-readable medium storing computer-executable instructions which, when executed by a computer, cause the computer to:
allocate a first beam of an array antenna for use as a first acquisition beam, while an omnidirectional gain is also provided by the array antenna, the omnidirectional gain extending an omnidirectional range associated with the array antenna and the first acquisition beam extending beyond the omnidirectional range of the array antenna;
define a coverage area for the first acquisition beam;
direct the first acquisition beam to move within the coverage area, wherein the coverage area begins at a first position and ends at a second position and wherein the first acquisition beam sweeps the coverage area from the first position to the second position for detection of any service request signals;
determine whether a service request signal is received at the array antenna from a wireless subscriber via the first acquisition beam as the first acquisition beam moves through the coverage area, the wireless subscriber located within a range of the first acquisition beam but beyond the omnidirectional range of the array antenna;
provision a connection to the wireless subscriber in response to determining that the service request signal was received;
determine that provisioning the connection to the wireless subscriber requires a second beam for providing an ongoing connection; and
reallocate the first acquisition beam to serve as the second beam for providing the ongoing connection.

14. The computer-readable medium of claim 13, wherein the instructions further cause the computer to:
determine a location of the wireless subscriber utilizing the service request signal;
utilize the location of the wireless subscriber for the second beam for enabling ongoing communication with the wireless subscriber via the second beam.

15. The computer-readable medium of claim 13, wherein the instructions further cause the computer to:
allocate a third beam of the array antenna for use as a second acquisition beam, the second acquisition beam extending beyond the omnidirectional range of the array antenna;
define a first portion of the coverage area for the first acquisition beam and a second portion of the coverage area for the second acquisition beam;
direct the first acquisition beam to move within the first portion of the coverage area and the second acquisition beam to move within the second portion of the coverage area; and
determine whether additional service request signals are received from additional wireless subscribers at the array antenna via the first acquisition beam and the second acquisition beam.

16. The computer-readable medium of claim 15, wherein the instructions further cause the computer to provision a connection to one of the additional wireless subscribers in response to determining that one of the additional service request signals was received.

17. The computer-readable medium of claim 16, wherein the instructions further cause the computer to:
determine that provisioning the connection to the one of the additional wireless subscribers will require a fourth beam for providing an ongoing connection; and
reallocate the second acquisition beam to serve as the fourth beam for providing the ongoing connection.

* * * * *